(12) United States Patent
Kyoung (10) Patent No.: US 11,126,932 B2
(45) Date of Patent: Sep. 21, 2021

(54) RESERVATION MANAGEMENT FOR ELECTRIC VEHICLE CHARGING

(71) Applicant: KT CORPORATION, Gyeonggi-do (KR)

(72) Inventor: Jin-Soo Kyoung, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 1170 days.

(21) Appl. No.: 14/197,760

(22) Filed: Mar. 5, 2014

(65) Prior Publication Data
US 2014/0257884 A1   Sep. 11, 2014

(30) Foreign Application Priority Data

Mar. 5, 2013   (KR) .................. 10-2013-0023294

(51) Int. Cl.
*G06Q 10/02*   (2012.01)
(52) U.S. Cl.
CPC ................................. *G06Q 10/02* (2013.01)
(58) Field of Classification Search
CPC ........................................................ G06Q 10/00
USPC ............................................................ 705/3
See application file for complete search history.

(56) References Cited

U.S. PATENT DOCUMENTS

| | | | |
|---|---|---|---|
| 8,472,979 B2* | 6/2013 | Dingier | G06Q 10/109 455/414.1 |
| 8,717,170 B1* | 5/2014 | Juhasz | B60L 11/1838 320/109 |
| 8,981,717 B2* | 3/2015 | Hayashi | B60L 3/12 180/65.1 |
| 9,165,264 B2* | 10/2015 | Egoshi | G06Q 10/02 |
| 2010/0280700 A1* | 11/2010 | Morgal | G06Q 10/02 701/31.4 |
| 2012/0233077 A1* | 9/2012 | Tate, Jr. | B60L 11/1816 705/65 |
| 2012/0245750 A1* | 9/2012 | Paul | G06Q 50/06 700/291 |
| 2013/0179057 A1* | 7/2013 | Fisher | B60L 11/1861 701/117 |
| 2013/0342310 A1* | 12/2013 | Park | B60L 3/12 340/5.7 |
| 2014/0125279 A1* | 5/2014 | Juhasz | H02J 7/0013 320/109 |

FOREIGN PATENT DOCUMENTS

| | | |
|---|---|---|
| JP | 2012-064114 A | 3/2012 |
| JP | 2012-190407 A | 10/2012 |
| KR | 10-1063656 B1 | 9/2011 |
| KR | 10-2012-0088162 A | 8/2012 |
| KR | 10-2012-0092755 A | 8/2012 |
| KR | 10-2012-0099977 A | 9/2012 |

* cited by examiner

*Primary Examiner* — Eliza A Lam
(74) *Attorney, Agent, or Firm* — IP Legal Services, LLC (57) ABSTRACT

The disclosure is related to managing a charging reservation of an electric vehicle. Particularly, the disclosure relates to managing an electric vehicle charging reservation based on at least one of a requested charging amount and a remaining battery power amount.

15 Claims, 6 Drawing Sheets

RESERVATION MANAGEMENT FOR ELECTRIC VEHICLE CHARGING

CROSS REFERENCE TO PRIOR APPLICATIONS

The present application claims priority under 35 U.S.C. § 119 to Korean Patent Application No. 10-2013-0023294 (filed on Mar. 5, 2013), which is hereby incorporated by reference in its entirety.

TECHNICAL FIELD

The present disclosure relates to an electric charging of electric vehicles and, in particular, to managing an electric charging reservation for the electric vehicles.

BACKGROUND

An electric vehicle moves by rotating its motor using electricity stored in a battery. Such electric vehicle was developed before of the development of a typical vehicle using an internal combustion engine. However, practical limitations of the electrical vehicle caused by the weight and the time required to charge its battery hindered the full commercialization of the electric vehicle. But, the environmental concerns of using the internal combustion engine have revitalized a further development of the electric vehicle.

The electric vehicle is similar to other typical vehicles with internal combustions engines except that it has an electric motor instead of a combustion engine. Unlike a typical vehicle, an important issue of the electric vehicle development is to reduce the size and the weight of the battery corresponding to its energy source. Particularly, reducing the time required to charge the battery is a critical element for the full commercialization of the electric vehicle.

In a case of an electric vehicle, an electric charging management is very important in operating the electric vehicle. In real life, users may be not able to operate an electric vehicle or may have to wait for a long time if the battery management is not properly performed.

A reservation for charging an electric vehicle may enable electric vehicle users to reduce a time consumption resulting from a charging wait. However, in the case that a plurality of reservation requests are made for the same electric vehicle charging station at the same or similar time, a charging wait may occur according to situations. Particularly, many reservations for a less charging amount may result in a reservation congestion. Accordingly, reservations for charging electric vehicles may be required to be efficiently managed.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a charging reservation of an electric vehicle may be managed based on at least one of a requested charging amount and a remaining battery power amount.

In accordance with at least one embodiment, a method may be provided for managing an electric charging reservation for an electric vehicle charging. The method may include receiving one or more charging reservation guide requests, and performing a charging reservation guide procedure associated with the one or more charging reservation guide requests, based on at least one of a requested charging amount and a remaining battery power amount.

The at least of the requested electric charging amount and the remaining battery power amount may be received from each corresponding electric vehicle terminal.

The performing may include transmitting a reservation disapproval message to a corresponding electric vehicle terminal when the requested charging amount included in each charging reservation guide request is lesser than a threshold value.

The performing may include transmitting a reservation disapproval message to a corresponding electric vehicle terminal when the remaining battery power amount included in each charging reservation guide request is greater than a threshold value.

In a case that two or more charging reservation guide requests are in a competition relationship for a same electric vehicle charging station, the performing may include determining a priority order between the two or more charging reservation guide requests, based on at least one of the requested charging amount and the remaining battery power amount.

The priority order may be in proportion to the requested charging amount, and is in inverse proportion to the remaining battery power amount.

The remaining battery power amount may be a battery power amount remaining at a time that a corresponding electric vehicle arrives at the same electric vehicle charging station.

The performing may include obtaining electric charger state information of the same electric vehicle charging station, from an electric charging management system, obtaining the number of available electric chargers from the electric charger state information, determining a charging reservation sequence between the two or more charging reservation guide requests, based on the number of available electric chargers, and providing charging reservation guide information including the charging reservation sequence, to each corresponding electric vehicle terminal.

The charging reservation guide information further may include at least one of a predicted required driving time, a required charging time, and a predicted waiting time for electric charging.

In accordance with at least one embodiment, a method may provide reservation guide information for an electric vehicle charging. The method may include detecting an entry of an electric vehicle to a range of a specific electric vehicle charging station, determining whether the electric vehicle can receive a charging service at a time when the electric vehicle arrives at the specific electric vehicle charging station, and providing charging reservation guide information to a corresponding electric vehicle terminal when the electric vehicle can receive the charging service. The detecting may include obtaining location information of the electric vehicle from the corresponding electric vehicle terminal, and determining whether the electric vehicle is within a range of the specific electric vehicle charging station, based on the location information.

The determining may include obtaining a remaining battery power amount of the electric vehicle from the corresponding electric vehicle terminal, obtaining electric charger state information of the specific electric vehicle charging station, determining an available start time associated with one or more electric chargers, based on the electric charger state information, and determining whether the electric vehicle can arrive at the specific electric vehicle charging station, before the available start time of the one or more electric chargers.

The available start time may be a time when the one or more electric chargers can be available.

The determining whether the electric vehicle can arrive at the specific electric vehicle charging station may include determining whether the electric vehicle can arrive at the specific electric vehicle charging station, based on the remaining battery power amount and the location information of the electric vehicle.

The electric charger state information may include charging schedule information. The charging reservation guide information may include at least one of the available start time, a predicted required driving time, and a predicted waiting time for an electric charging.

In accordance with at least one embodiment, a method may provide reservation alarm information for an electric vehicle charging. The method may include determining whether a remaining battery power amount of an electric vehicle is lesser than a threshold value, determining one or more electric vehicle charging stations reachable by the electric vehicle when the remaining battery power amount of an electric vehicle is lesser than the threshold value, and providing electric charging alarm information to a corresponding electric vehicle terminal.

The remaining battery power amount may be obtained from the corresponding electric vehicle terminal.

The determining one or more electric vehicle charging stations may include determining the one or more electric vehicle charging stations at which the electric vehicle can arrive, based on the remaining battery power amount and location information of the electric vehicle.

The method may further include obtaining electric charger state information associated with the reachable one or more electric vehicle charging stations, wherein the electric charger state information is employed for creation of the electric charging alarm information.

The electric charging alarm information may include at least one of a predicted required driving time, and a predicted waiting time for electric charging.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may manage a charging reservation of an electric vehicle. Particularly, the present embodiment may manage a charging reservation based on at least one of a requested charging amount and a remaining battery power amount.

Figure 1:
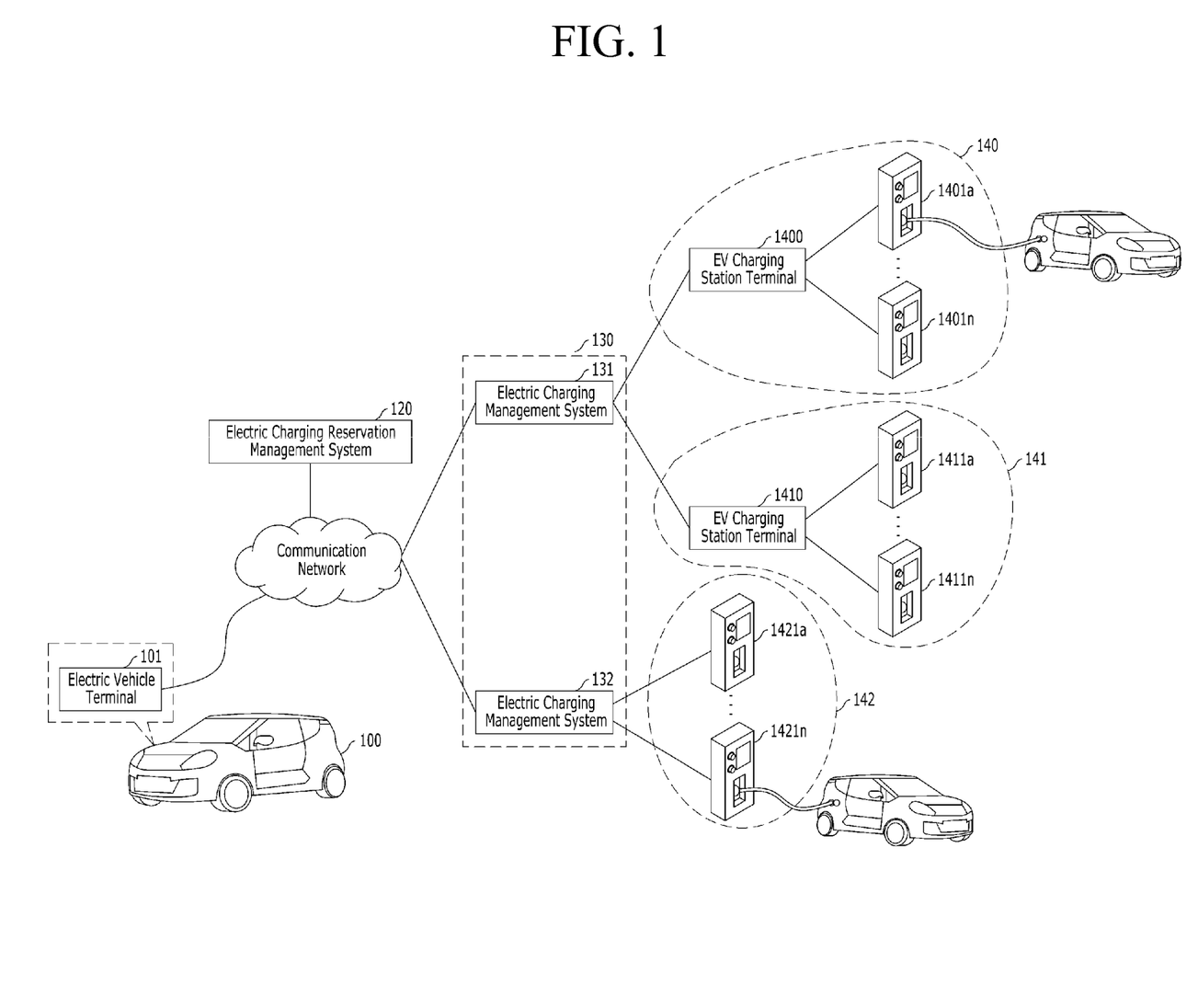
FIG. 1 illustrates interworking between systems for managing a reservation service for an electric vehicle charging in accordance with at least one embodiment.

FIG. 1 illustrates interworking between systems for managing a reservation service for an electric vehicle charging in accordance with at least one embodiment.

Referring to FIG. 1, in order to manage an electric vehicle charging reservation, electric charging reservation management system 120 according to at least one embodiment may perform may interwork with (i) electric vehicle terminal 101 associated with an electric vehicle (EV) (e.g., 100), and/or (ii) electric charging management system 130. Electric charging reservation management system 120 will be described in detail with reference to FIG. 2, and FIG. 4 to FIG. 7. Electric vehicle terminal 101 will be described in detail with reference to FIG. 3, and FIG. 4 to FIG. 7.

As shown in FIG. 1, such systems may communicate each other through a communication network. Herein, the communication network may include a variety of wired/wireless communication networks such as a CDMA network, a WCDMA network, a GSM network, an LTE network, an LTE-A network, a WiBro network, and/or a WiFi network, but is not limited thereto.

Electric charging management system 131 may manage a plurality of electric vehicle (EV) charging stations 140 and 141. More specifically, electric charging management system 131 may collect and manage electric charger state information. Herein, the electric charger state information may include an electric charging schedule for each electric vehicle (EV) charging station 140 or 141, and state information of electric chargers (e.g., 1401a through 1401n, and/or 1411a through 1411n). In this case, electric charging management system 131 may manage a plurality of electric vehicle (EV) charging stations 140 and 141 independently or through a form of integration. Herein, each of the plurality of electric vehicle (EV) charging stations 140 and 141 may include a plurality of electric chargers. For example, electric vehicle (EV) charging station 140 may include electric chargers 1401a through 1401n. Electric vehicle (EV) charging station 141 may include electric chargers 1411a through 1411n. Furthermore, each of electric vehicle (EV) charging stations 140 and 141 may include electric vehicle (EV) charging station terminal (which may be referred to as "an EV charging station server") 1400 or 1410 which enables a communication or data transmission between electric charging management system 131 and electric chargers 1401a through 1401n, and/or 1411a through 1411n.

Meanwhile, electric charging management system 132 may be a dedicated system for managing a specific electric vehicle (EV) charging station 142. Electric vehicle (EV) charging station 142 may include electric chargers 1421a through 1421n. More specifically, electric charging management system 132 may collect and manage electric charger state information. Herein, the electric charger state information may include an electric charging schedule, and state information of electric chargers (e.g., 1421a through 1421n). Hereinafter, for convenience, electric charging management systems 131 and 132 may be collectively referred to as "electric charging management system 130." Furthermore, electric charging management system 130 may correspond to any one of (i) electric charging management system 131, (ii) electric charging management system 132, and (iii) electric charging management systems 131 and 132, according to embodiments.

In other embodiments, one or more individual electric chargers (not shown in FIG. 1) may directly interwork with electric charging management system 130, in order to perform a charging reservation management. In the present specification, electric charging management system 130 may be used as a concept including the one or more individual electric chargers.

Electric vehicles (EVs) may include electric cars (e.g., 100), electric motorcycles, and/or electric motorbikes, but are not limited thereto.

Figure 2:
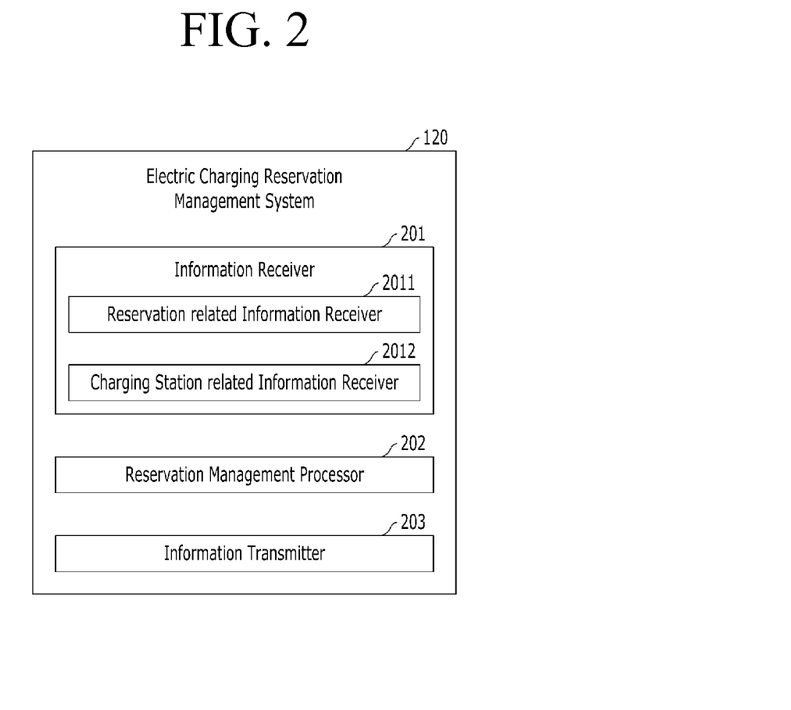
FIG. 2 is a block diagram illustrating a structure of an electric charging reservation management system in accordance with at least one embodiment.

FIG. 2 is a block diagram illustrating a structure of an electric charging reservation management system in accordance with at least one embodiment.

As shown in FIG. 2, electric charging reservation management system 120 according to at least one embodiment may information receiver 201, reservation management processor 202, and information transmitter 203.

Information receiver 201 may receive (i) reservation related information and/or (ii) charging station related information. More specifically, as shown in FIG. 2, information receiver 201 may include reservation related information receiver 2011 and charging station related information receiver 2012.

Reservation related information receiver 2011 may receive a variety of reservation related information, i.e., information associated with an electric charging reservation for an electric vehicle (e.g., 100). Herein, the reservation related information may include at least one of (i) information associated with a charging reservation guide request (FIG. 4 and FIG. 5), (ii) reference information for a charging reservation guide (FIG. 6), and (iii) reference information for a charging reservation alarm (FIG. 7). For example, the information associated with the charging reservation guide request may include at least one of vehicle identification information, requested charging amount information, remaining battery power information, a search range, location information of an electric vehicle, and so forth. Herein, the vehicle identification information may represent information used to differentiate a certain electric vehicle from other electric vehicles. For example, a vehicle plate number, a vehicle identification number, an EV battery identification information, identification information of an EV terminal (e.g., 101) installed in an electric vehicle (e.g., 100), identification information (e.g., a phone number) of user equipment capable of communicating with a battery management system (BMS) of an electric vehicle, and so forth.

Charging station related information receiver 2012 may receive electric charger state information from electric vehicle charging station 130. Herein, the electric charger state information may include at least one of charging schedule information, information on whether each electric charger properly works, and information on preoccupied electric chargers.

Reservation management processor 202 may create a variety of information such as charging reservation guide information (FIG. 4, FIG. 5, and FIG. 6), and electric charging alarm information (FIG. 7), and/or charging reservation complete message (FIG. 4 and FIG. 5), based on (i) information (e.g., vehicle identification information, requested charging amount information, remaining battery power information, location information of an electric vehicle, etc.) received from electric vehicle terminal 101 and (ii) information (e.g., electric charger state information) received from electric charging management system 130. Operations of reservation management processor 202 will be described in detail with reference to FIG. 4 through FIG. 7. For example, operations S402, S410, S412, S416, S418, S420, S422, S424, S430, S502, S510, S512, S516, S518, S520, S522, S524, S530, S602, S604, S610, S612, S614, S616, S702, S704, S706, S708, and/or S714 may be performed in reservation management processor 202.

Information transmitter 203 may transmit information and/or messages created by reservation management processor 202, to electric vehicle terminal 101 or electric charging management system 130. Operations of information transmitter 203 will be described in detail with reference to FIG. 4 through FIG. 7. For example, the information, requests, messages may include electric vehicle charging station information (S402, S502), a request for electric charger sate information (S406, S506, S606, S710), a reservation disapproval guide message (S414, S514), charging reservation guide information (5426, S526, S616), a charging reservation complete message (S432, S434, S532, S534), and/or electric charging alarm information (S716).

Figure 3:
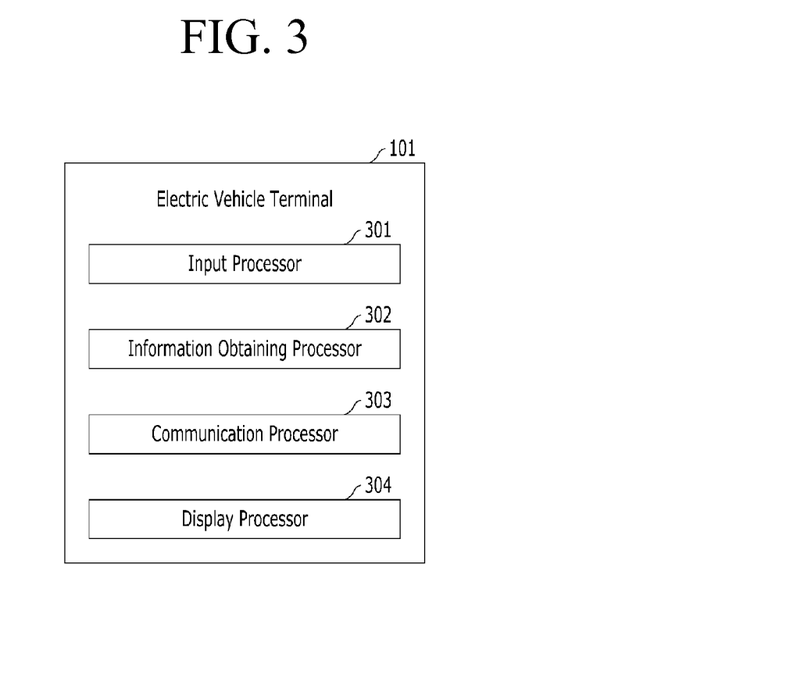
FIG. 3 is a block diagram illustrating an electric vehicle terminal associated with an electric vehicle in accordance with at least one embodiment.

FIG. 3 is a block diagram illustrating an electric vehicle terminal associated with an electric vehicle in accordance with at least one embodiment.

As shown in FIG. 3, electric vehicle (EV) terminal 101 installed (or included) an electric vehicle (e.g., 100) may include input processor 301, information obtaining processor 302, communication processor 303, display processor 304. Electric vehicle terminal 101 may perform operations described later with reference to FIG. 4 through FIG. 7. Accordingly, the detailed descriptions thereof will be omitted herein. Each constituent element of electric vehicle terminal 101 will be briefly described.

Input processor 301 may receive a variety of input data from an electric vehicle user. Herein, the input data may include user input data (e.g., a requested charging amount) for a variety of requests (e.g., a charging reservation guide request).

Information obtaining processor 302 may obtain remaining battery power amount information (e.g., SOC information) from a battery management system (BMS) of an electric vehicle 100. Furthermore, information obtaining processor 302 may obtain location information of a corresponding electric vehicle (e.g., 100), by interworking with a global positioning system (GPS). Herein, the location information of the corresponding electric vehicle (e.g., 100) may include location information of the electric vehicle (EV) terminal 101.

Communication processor 303 may transmit and receive signals, data, information, and/or messages (e.g., request messages) required for performing the present embodiment, in connection with electric charging reservation management system 120 through a telecommunication network. More specifically, communication processor 303 may transmit a charging reservation guide request to electric charging management system 130. Furthermore, communication processor 303 may transmit (i) reference information for an electric charging guide and/or (ii) reference information for an electric charging alarm service, to electric charging reservation management system 120. Herein, the reference information may include vehicle identification information, remaining battery power amount information, electric vehicle location information, and so forth.

Display processor 304 may display a variety of information received from charging reservation management system 120. Herein, the variety of information may include charging reservation guide information (see FIG. 4, FIG. 5, and Table 1), charging reservation guide information (see FIG. 6), and/or electric charging alarm information (see FIG. 7). The input processor 301 may be implemented as a touch screen of the display processor 304.

Electric vehicle terminal 101 may be a dedicated device for an electric vehicle charging management. In other embodiments, electric vehicle terminal 101 may be a navigation terminal (i.e., a navigation terminal installed in the electric vehicle 100) which can interwork with the battery management system (BMS) of the electric vehicle 100. Alternatively, electric vehicle terminal 101 may be user equipment (e.g., a smart phone, a laptop computer, etc.) which can interwork with the battery management system (BMS) of the electric vehicle 100 and/or a global positioning system (GPS).

Figure 4:
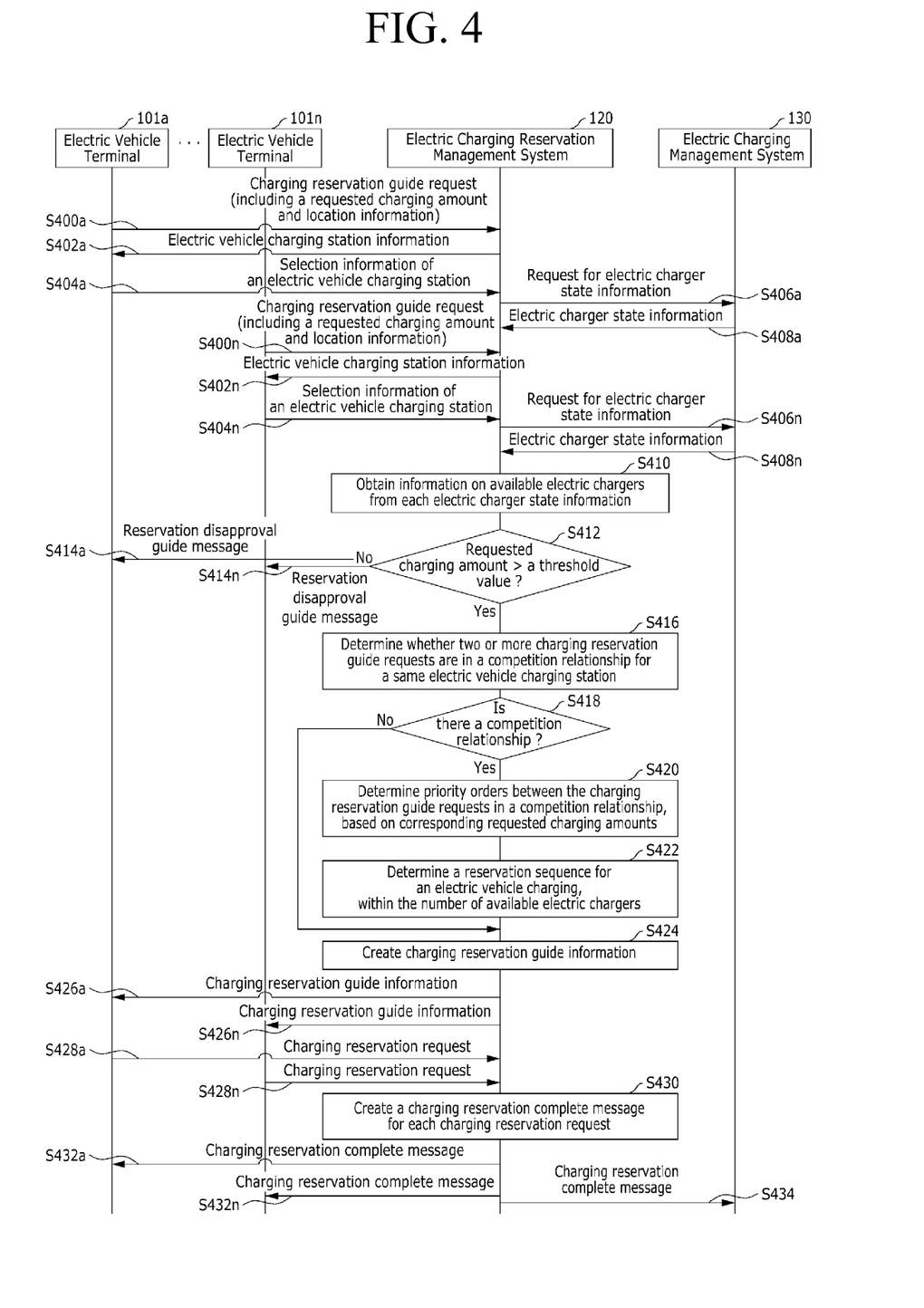
FIG. 4 illustrates a method of managing an electric vehicle charging reservation based on a required charging amount in accordance with at least one embodiment.

FIG. 4 illustrates a method of managing an electric vehicle charging reservation based on a requested charging amount in accordance with at least one embodiment.

Referring to FIG. 4, at steps S400a to S400n, electric charging reservation management system 120 (more specifically, reservation related information receiver 2011) may receive a plurality of charging reservation guide request from a plurality EV terminals 101a through 101n. Herein, each of the plurality of charging reservation guide requests may include vehicle identification information, information on a requested charging amount (i.e., an electric power amount to which an electric vehicle user wants to charge an electric vehicle), and/or electric vehicle location information. The requested charging amount may be expressed as a specific electric power value (e.g., 10 kWh) or a percentage (e.g., 80%) of a full charge. In other embodiments, each of the plurality of charging reservation guide requests may further include information on a currently remaining battery power amount.

At steps S402a through S402n, when receiving the charging reservation guide request, electric charging reservation management system 120 may transmit information on one or more electric vehicle (EV) charging stations based on location information of each electric vehicle, to each EV terminal 101a, . . . , or 101n. In other embodiments, in the case that a charging reservation guide request includes a search range, electric charging reservation management system 120 may transmit information on electric vehicle charging stations positioned within the search range.

Each electric vehicle user may select an electric vehicle (EV) charging station for an electric charging of a corresponding electric vehicle. In this case, at steps S404a through S404n, each of EV terminal 101a through EV terminals 101n may transmit information on selection of an electric vehicle (EV) charging station, to electric charging reservation management system 120.

At steps S406a through S406n, when receiving user selection information from each of EV terminal 101a through EV terminals 101n, electric charging reservation management system 120 (more specifically, charging station related information receiver 2012) may transmit a request for electric charger state information, to electric charging management system 130. More specifically, electric charging reservation management system 120 may separately transmit an electric charger state information request associated with each user selection information received from each of EV terminal 101a through EV terminals 101n. For example, when receiving user selection information from EV terminal 101a, electric charging reservation management system 120 may transmit a request for electric charger state information of the selected electric vehicle (EV) charging station, to a corresponding electric charging management system (e.g., electric charging management system 130).

At step S408a through 408n, electric charging reservation management system 120 (more specifically, charging station related information receiver 2012) may receive (or collect) a plurality of electric charger state information in response to each electric charger state information request from electric charging management system 130. Herein, the electric charger state information may include an electric charging schedule in a corresponding electric vehicle charging station, and/or information on corresponding electric chargers.

At step S410, electric charging reservation management system 120 may obtain information on available electric chargers in a corresponding electric vehicle charging station, from each electric charger state information. Herein, the available electric chargers may represent electric chargers which are not occupied by electric vehicles at a specific time (e.g., at the time when a corresponding electric vehicle arrives at a corresponding electric vehicle charging station), among electric chargers which can properly work. The available electric charger may be determined based on (i) whether a corresponding electric charger can be properly operated, and (ii) an electric charging schedule associated with the corresponding electric charger. Accordingly, the information on the available electric chargers may include the number of available electric chargers.

At step S412, electric charging reservation management system 120 may determine whether each requested charging amount (i.e., a requested charging amount included in each charging reservation guide request) exceeds a threshold value. Herein, the threshold value may be predetermined. In at least one embodiment, the threshold value may be predetermined by a corresponding electric vehicle charging station. In other embodiments, the reference information associated with a requested charging amount may be differently determined per electric vehicle charging station. Furthermore, a less threshold value may induce an electric vehicle user to frequently charge an electric vehicle. Particularly, the number of battery charge/discharge cycles may affect the performance and the life-cycle of an electric battery. Accordingly, the threshold value may be required to be determined as a proper value. More specifically, the threshold value may be determined based on at least one of a charging efficiency, a management convenience, a battery performance, a life-cycle of an electric battery, and profit of an electric vehicle charging station. For example, the threshold value may be determined as a percentage (e.g., 50%) of full charge or an electric power value (e.g., 10 kWh).

At steps S414a through S414n, when a corresponding requested charging amount does not exceed the threshold value (No-S412), electric charging reservation management system 120 may transmit a reservation disapproval guide message to a corresponding EV terminal (e.g., 101a, . . . , or 101n). For example, in the case that a requested charging amount included in a charging reservation guide request received from EV terminal 101n does not exceed the threshold value (No-S412), electric charging reservation management system 120 may transmit a reservation disapproval guide message to EV terminal 101n. In this case, a corresponding electric vehicle user may not make a reservation for an electric vehicle charging. In other embodiment, electric charging reservation management system 120 may discard a corresponding charging reservation guide request.

At step S416, when a corresponding requested charging amount exceeds the threshold value (Yes-S412), electric charging reservation management system 120 may determine whether two or more charging reservation guide requests are in a competition relationship for a same electric vehicle charging station, i.e., whether there is a competition relationship between two or more charging reservation guide requests. For example, two or more electric vehicles associated with two or more charging reservation guide requests may be predicted to arrive at the same electric vehicle charging station in the same time range. For another example, two or more charging reservation guide requests may request an electric charging service in the same time range at the same electric vehicle charging station. In this case, a competition relationship for a same electric vehicle charging station may occur. More specifically, electric charging reservation management system 120 may determine whether there is a competition relationship, based on at least one of (i) location information of two or more electric vehicles associated with two or more charging reservation guide requests, (ii) electric charger state information (e.g., a charging schedule, information on electric chargers, etc.) of a corresponding electric vehicle charging station, (iii) a predicted arrival time (i.e., a predicted arrival time to the corresponding electric vehicle charging station) the of two or more electric vehicles associated with two or more charging reservation guide requests. (iv) a requested charging amount, (v) a predicted charging time, and (vi) a time at which users wants (or requests) to charge the corresponding electric vehicle.

At step S420, when two or more charging reservation guide requests are in a competition for a same electric vehicle charging station (Yes-S418), i.e., when there is a competition relationship between the two or more charging reservation guide requests, electric charging reservation management system 120 may determine priority orders between the charging reservation guide requests in a competition relationship, based on corresponding requested charging amounts. More specifically, the larger the requested charging amount is, the higher priority a corresponding charging reservation guide request may have.

Meanwhile, in the case that two or more charging reservation guide requests have the same requested charging amount, priority orders between them may be determined based on a remaining battery power amount. That is, the lesser the remaining battery power amount is, the higher priority a corresponding charging reservation guide request may have. Herein, the remaining battery power amount may be either a currently remaining battery power amount or a predicted remaining battery power amount. More specifically, each of the charging reservation guide requests (S400a through S400n) may further include information on the currently remaining battery power amount. In this case, electric charging reservation management system 120 may calculate the predicted remaining battery power amount (i.e., a battery power amount remaining at the time that a corresponding electric vehicle arrives at a corresponding electric vehicle charging station), using (i) the currently remaining battery power amount, (ii) location information of the corresponding electric vehicle, and (iii) location information of a corresponding electric vehicle charging station. More specifically, electric charging reservation management system 120 may calculate a battery power amount (i.e., a predicted power consumption amount) which will be consumed until the corresponding electric vehicle arrives at the corresponding electric vehicle charging station. The predicted remaining battery power amount may be obtained by subtracting the predicted power consumption amount from the currently remaining battery power amount.

At step S422, electric charging reservation management system 120 may determine a charging reservation sequence for each charging reservation guide request in a competition relationship, within the number of available electric chargers.

At step S424, when the charging reservation sequence is determined, electric charging reservation management system 120 may create corresponding charging reservation guide information for each corresponding electric vehicle terminal. Herein, the corresponding charging reservation guide information may include a charging reservation sequence for a corresponding electric vehicle. Furthermore, the corresponding charging reservation guide information may include information on a corresponding electric vehicle charging station, and/or information on one or more corresponding electric chargers. Meanwhile, when two or more charging reservation guide requests are not in a competition for a same electric vehicle charging station (No-S418), i.e., when there is no competition relationship between charging reservation guide requests, at step S424, electric charging reservation management system 120 may create corresponding charging reservation guide information in response to each charging reservation guide request.

In other embodiments, the created charging reservation guide information may include a predicted required driving time (i.e., a required time when a corresponding electric vehicle goes to a corresponding electric vehicle charging station), and/or a required charging time (i.e., a required time when a corresponding electric vehicle is charged). The predicted required driving time may be calculated, using an electric vehicle location and a distance between an electric vehicle and a corresponding electric vehicle charging station. The required charging time may be calculated based on a requested charging amount. In another embodiment, in the case that there is no available electric charger to be assigned to a corresponding electric vehicle associated with a charging reservation guide request, a predicted waiting time for an electric charging may be included in the charging reservation guide information. Herein, the predicted waiting time may represent a time interval after an arrival at a corresponding electric vehicle charging station until an electric charging begins. In this case, the predicted waiting time may be calculated from a charging schedule of an electric vehicle preoccupying a corresponding electric charger.

In another embodiment, the created charging reservation guide information may include a variety of information such as name information of electric vehicle charging stations, distance information between an electric vehicle and each electric vehicle charging station, reservation status information, and/or reference information associated with as requested charging amount (i.e., reference of a requested charging amount). In other words, the created charging reservation guide information may be provided in form of list as described in Table 1 below. Herein, the reference information associated with a requested charging amount may be a threshold value (e.g., a threshold value at step S412) predetermined by a corresponding electric vehicle charging station. Furthermore, the reference information associated with a requested charging amount may be differently determined per electric vehicle charging station. In other embodiments, in the case that a charging reservation guide request includes a search range, the created charging reservation guide information may include information on electric vehicle charging stations positioned within the search range.

At steps S426a through S426n, electric charging reservation management system 120 may transmit each created charging reservation guide information to each corresponding electric vehicle terminal 101a, 101b, ..., or 101n. When receiving charging reservation guide information from electric charging reservation management system 120, each corresponding electric vehicle terminal 101a, 101b, ..., or 101n may display the received charging reservation guide information. In each corresponding electric vehicle terminal 101a, 101b, ..., or 101n, the received charging reservation guide information may be displayed as described in Table 1 below.

TABLE 1

| EV Charging Station Name | Distance | Reservation Status | Reference of requested charging amount | Reservation Request | Input of requested charging amount |
|---|---|---|---|---|---|
| A | 8 km | Impossible | 30 kWh | Select | (Input) |
| B | 12 km | Possible | 40 kWh | Select | (Input) |
| C | 21 km | Possible | 20 kWh | Select | (Input) |
| D | 27 km | Possible | 30 kWh | Select | (Input) |

At steps S428a through S428n, each electric vehicle user may transmit a charging reservation request to electric charging reservation management system 120, using a corresponding electric vehicle terminal (e.g., 101a, ..., or 101n). Herein, the charging reservation request may correspond to a confirmation message for a charging reservation. Furthermore, the charging reservation request may include at least one of electric vehicle identification information, a required charging amount, an electric vehicle charging station identification information, and an electric charger identification information.

At step S430, when receiving a charging reservation request from each electric vehicle terminal, electric charging reservation management system 120 may create a charging reservation complete message for each charging reservation request.

At steps S432a through S432n, electric charging reservation management system 120 may transmit each charging reservation complete message to a corresponding electric vehicle terminal (e.g., 101a, ..., or 101n). Furthermore, electric charging reservation management system 120 may transmit each charging reservation complete message to corresponding electric charging management system (e.g., 130).

Meanwhile, in other embodiments, in the case that an electric vehicle user changes a requested charging amount, and transmits a charging reservation guide request including the changed requested charging amount, operations S402a through S434 may be performed. In this case, the electric vehicle user may receive 'changed charging reservation guide information' from electric charging reservation management system 120.

Figure 5:
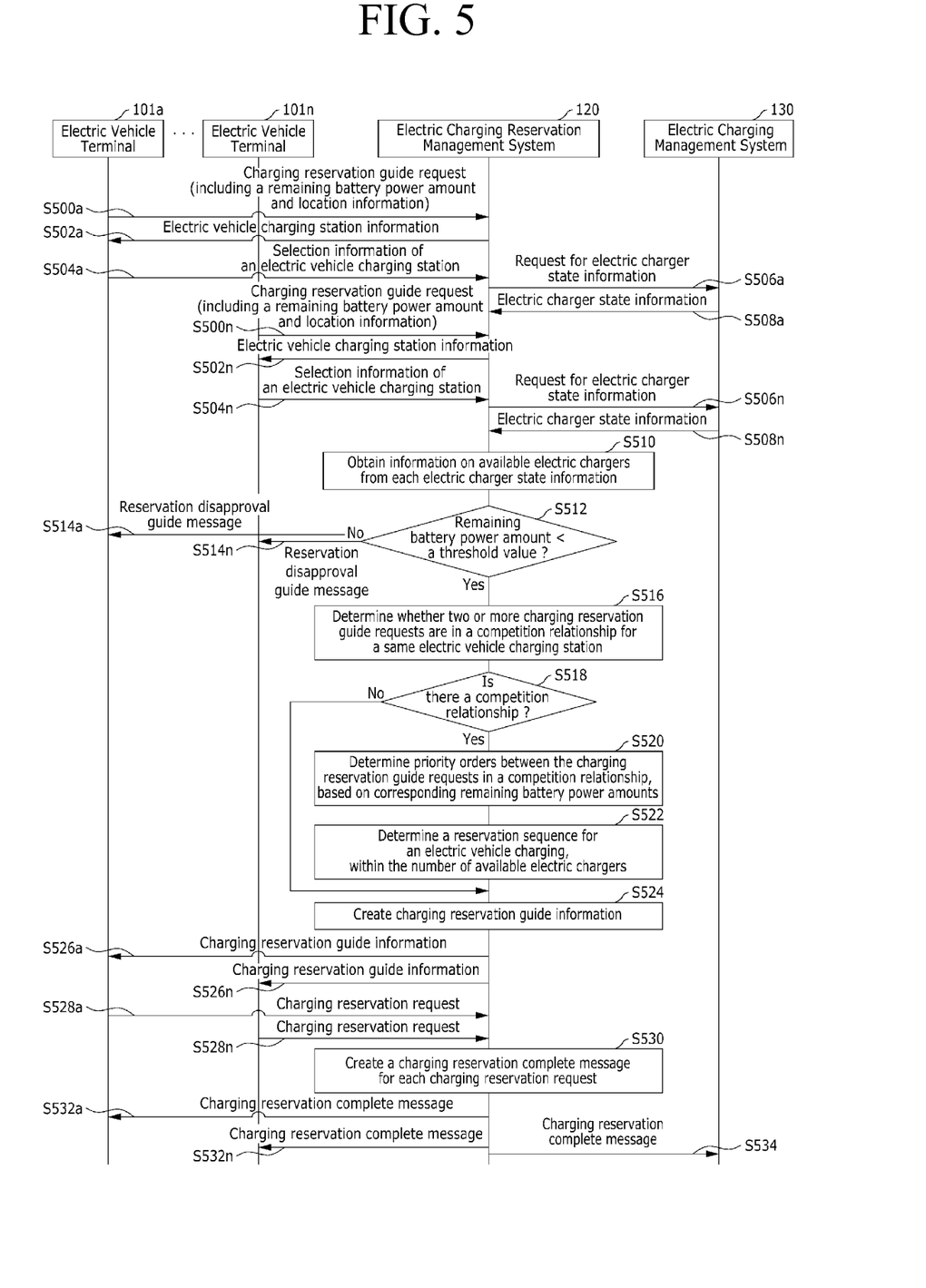
FIG. 5 illustrates a method of managing an electric vehicle charging reservation based on a remaining battery power amount in accordance with at least one embodiment.

FIG. 5 illustrates a method of managing an electric vehicle charging reservation based on a remaining battery power amount in accordance with at least one embodiment.

Referring to FIG. 5, at steps S500a to S500n, electric charging reservation management system 120 (more specifically, reservation related information receiver 2011) may receive a plurality of charging reservation guide request from a plurality EV terminals 101a through 101n. Herein, each of the plurality of charging reservation guide requests may include vehicle identification information, information on a remaining battery power amount, and/or electric vehicle location information. The remaining battery power amount may be information on a currently remaining battery power amount. In other embodiments, each of the plurality of charging reservation guide requests may further include information on a requested charging amount (i.e., an electric power amount to which an electric vehicle user wants to charge an electric vehicle). In other embodiments, the remaining battery power amount may be expressed as 'state of charge' (SOC) information.

At steps S502a through S502n, when receiving the charging reservation guide request, electric charging reservation management system 120 may transmit information on one or more electric vehicle (EV) charging stations based on location information of each electric vehicle, to each EV terminal 101a, ..., or 101n. In other embodiments, in the case that a charging reservation guide request includes a search range, electric charging reservation management system 120 may transmit information on electric vehicle charging stations positioned within the search range.

Each electric vehicle user may select an electric vehicle (EV) charging station for an electric charging of a corresponding electric vehicle. In this case, at steps S504a through S504n, each of EV terminal 101a through EV terminals 101n may transmit information on selection of an electric vehicle (EV) charging station, to electric charging reservation management system 120.

At steps S506a through S506n, when receiving user selection information from each of EV terminal 101a through EV terminals 101n, electric charging reservation management system 120 (more specifically, charging station related information receiver 2012) may transmit a request for electric charger state information, to electric charging management system 130. More specifically, electric charging reservation management system 120 may separately transmit an electric charger state information request associated with each user selection information received from each of EV terminal 101a through EV terminals 101n. For example, when receiving user selection information from EV terminal 101a, electric charging reservation management system 120 may transmit a request for electric charger state information of the selected electric vehicle (EV) charging station, to a corresponding electric charging management system (e.g., electric charging management system 130).

At steps S508a through 508n, electric charging reservation management system 120 (more specifically, charging station related information receiver 2012) may receive (or collect) a plurality of electric charger state information in response to each electric charger state information request from electric charging management system 130. Herein, the electric charger state information may include an electric charging schedule in a corresponding electric vehicle charging station, and/or information on corresponding electric chargers.

At step S510, electric charging reservation management system 120 may obtain information on available electric chargers in a corresponding electric vehicle charging station, from each electric charger state information. Herein, the available electric chargers may represent electric chargers which are not occupied by electric vehicles at a specific time (e.g., at the time when a corresponding electric vehicle arrives at a corresponding electric vehicle charging station), among electric chargers which can properly work. The available electric charger may be determined based on (i) whether a corresponding electric charger can be properly operated, and (ii) an electric charging schedule associated with the corresponding electric charger. Accordingly, the information on the available electric chargers may include the number of available electric chargers.

At step S512, electric charging reservation management system 120 may determine whether each remaining battery power amount is lesser than a threshold value. Herein, the threshold value may be predetermined. In at least one embodiment, the threshold value may be predetermined by a corresponding electric vehicle charging station. In other embodiments, the threshold value may be differently determined per electric vehicle charging station. The remaining battery power amount may be a currently remaining battery power amount (i.e., a remaining battery power amount included in the charging reservation guide request). In other embodiments, the remaining battery power amount may be a predicted remaining battery power amount (i.e., a battery power amount remaining at the time that a corresponding electric vehicle arrives at a corresponding electric vehicle charging station). More specifically, electric charging reservation management system 120 may calculate the predicted remaining battery power amount, using (i) the currently remaining battery power amount, (ii) location information of the corresponding electric vehicle, and (iii) location information of a corresponding electric vehicle charging station. For example, electric charging reservation management system 120 may calculate a battery power amount (i.e., a predicted power consumption amount) which will be consumed until the corresponding electric vehicle arrives at the corresponding electric vehicle charging station. The predicted remaining battery power amount may be obtained by subtracting the predicted power consumption amount from the currently remaining battery power amount.

Furthermore, the number of battery charge/discharge cycles may affect the performance and the life-cycle of an electric battery. Accordingly, the threshold value may be required to be determined as a proper value. More specifically, the threshold value may be determined based on at least one of a charging efficiency, a management convenience, a battery performance, a life-cycle of an electric battery, and profit of an electric vehicle charging station.

At steps S514a through S514n, when a corresponding remaining battery power amount is not lesser than the threshold value (No-S512), electric charging reservation management system 120 may transmit a reservation disapproval guide message to a corresponding EV terminal (e.g., 101a, . . . , or 101n). For example, in the case that a remaining battery power amount associated with EV terminal 101n exceeds the threshold value (No-S512), electric charging reservation management system 120 may transmit a reservation disapproval guide message to EV terminal 101n. In this case, a corresponding electric vehicle user may not make a reservation for an electric vehicle charging. In other embodiment, electric charging reservation management system 120 may discard a corresponding charging reservation guide request.

At step S516, when a corresponding remaining battery power amount is lesser than the threshold value (Yes-S512), electric charging reservation management system 120 may determine whether two or more charging reservation guide requests are in a competition relationship for a same electric vehicle charging station. i.e., whether there is a competition relationship between two or more charging reservation guide requests. For example, two or more electric vehicles associated with two or more charging reservation guide requests may be predicted to arrive at the same electric vehicle charging station in the same time range. For another example, two or more charging reservation guide requests may request an electric charging service in the same time range at the same electric vehicle charging station. In this case, a competition relationship for a same electric vehicle charging station may occur. More specifically, electric charging reservation management system 120 may determine whether there is a competition relationship, based on at least one of (i) location information of two or more electric vehicles associated with two or more charging reservation guide requests, (ii) electric charger state information (e.g., a charging schedule, information on electric chargers, etc.) of a corresponding electric vehicle charging station, (iii) a predicted arrival time (i.e., a predicted arrival time to the corresponding electric vehicle charging station) the of two or more electric vehicles associated with two or more charging reservation guide requests. (iv) a remaining battery power amount, (v) a predicted charging time, and (vi) a time at which users wants (or requests) to charge the corresponding electric vehicle.

At step S520, when two or more charging reservation guide requests are in a competition for a same electric vehicle charging station (Yes-S518), i.e., when there is a competition relationship between the two or more charging reservation guide requests, electric charging reservation management system 120 may determine priority orders between the charging reservation guide requests in a competition relationship, based on corresponding remaining battery power amounts. More specifically, the larger the remaining battery power amount is, the lower priority a corresponding charging reservation guide request may have.

Meanwhile, in the case that two or more charging reservation guide requests have the same remaining battery power amount, priority orders between them may be determined based on a requested charging amount. That is, the larger the requested charging amount is, the higher priority a corresponding charging reservation guide request may have.

At step S522, electric charging reservation management system 120 may determine a charging reservation sequence for each charging reservation guide request in a competition relationship, within the number of available electric chargers.

At step S524, when the charging reservation sequence is determined, electric charging reservation management system 120 may create corresponding charging reservation guide information for each corresponding electric vehicle terminal (e.g., 101a, . . . , or 101n). Herein, the corresponding charging reservation guide information may include a charging reservation sequence for a corresponding electric vehicle. Furthermore, the corresponding charging reservation guide information may include information on a corresponding electric vehicle charging station, and/or information on one or more corresponding electric chargers. Meanwhile, when two or more charging reservation guide requests are not in a competition for a same electric vehicle charging station (No-S518), i.e., when there is no competition relationship between charging reservation guide requests, at step S524, electric charging reservation management system 120 may create corresponding charging reservation guide information in response to each charging reservation guide request.

In other embodiments, the created charging reservation guide information may include a predicted required driving time (i.e., a required time when a corresponding electric vehicle goes to a corresponding electric vehicle charging station), and/or a required charging time (i.e., a required time when a corresponding electric vehicle is charged). The predicted required driving time may be calculated, using an electric vehicle location and a distance between an electric vehicle and a corresponding electric vehicle charging station. The required charging time may be calculated based on a remaining battery power amount. In another embodiment, in the case that there is no available electric charger to be assigned to a corresponding electric vehicle associated with a charging reservation guide request, a predicted waiting time for an electric charging may be included in the charging reservation guide information. Herein, the predicted waiting time may represent a time interval after an arrival at a corresponding electric vehicle charging station until an electric charging begins. In this case, the predicted waiting time may be calculated from a charging schedule of an electric vehicle preoccupying a corresponding electric charger.

In another embodiment, the created charging reservation guide information may include a variety of information such as name information of electric vehicle charging stations, distance information between an electric vehicle and each electric vehicle charging station, reservation status information (i.e., reservation possibility information), and/or reference information associated with as requested charging amount (i.e., reference of a requested charging amount). In other words, the created charging reservation guide information may be provided in form of list as described in Table 1 above. In other embodiments, in the case that a charging reservation guide request includes a search range, the created charging reservation guide information may include information on electric vehicle charging stations positioned within the search range.

At steps S526a through S526n, electric charging reservation management system 120 may transmit each created charging reservation guide information to each corresponding electric vehicle terminal 101a, 101b, . . . , or 101n. When receiving charging reservation guide information from electric charging reservation management system 120, each corresponding electric vehicle terminal 101a, 101b, . . . , or 101n may display the received charging reservation guide information. In each corresponding electric vehicle terminal 101a, 101b, . . . , or 101n, the received charging reservation guide information may be displayed as described in Table 1 above.

At steps S528a through S528n, each electric vehicle user may transmit a charging reservation request to electric charging reservation management system 120, using a corresponding electric vehicle terminal (e.g., 101a, . . . , or 101n). Herein, the charging reservation request may correspond to a confirmation message for a charging reservation. Furthermore, the charging reservation request may include at least one of electric vehicle identification information, a remaining battery power amount, an electric vehicle charging station identification information, and an electric charger identification information.

At step S530, when receiving a charging reservation request from each electric vehicle terminal, electric charging reservation management system 120 may create a charging reservation complete message for each charging reservation request.

At steps S532a through S532n, electric charging reservation management system 120 may transmit each charging reservation complete message to a corresponding electric vehicle terminal (e.g., 101a, . . . , or 101n). Furthermore, electric charging reservation management system 120 may transmit each charging reservation complete message to corresponding electric charging management system (e.g., 130).

Figure 6:
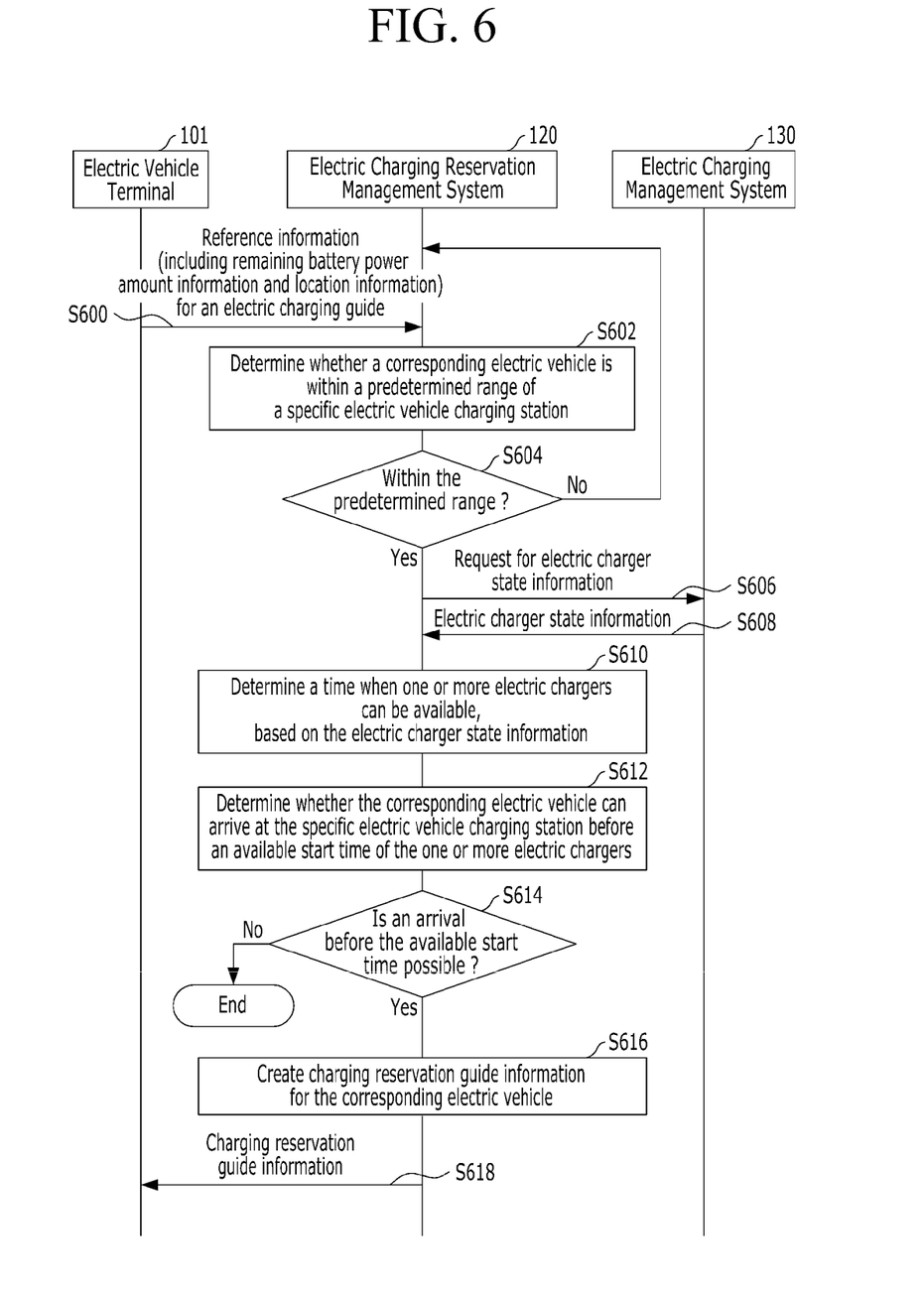
FIG. 6 illustrates a method of providing reservation guide information for an electric vehicle charging in accordance with at least one embodiment.
Figure 7:
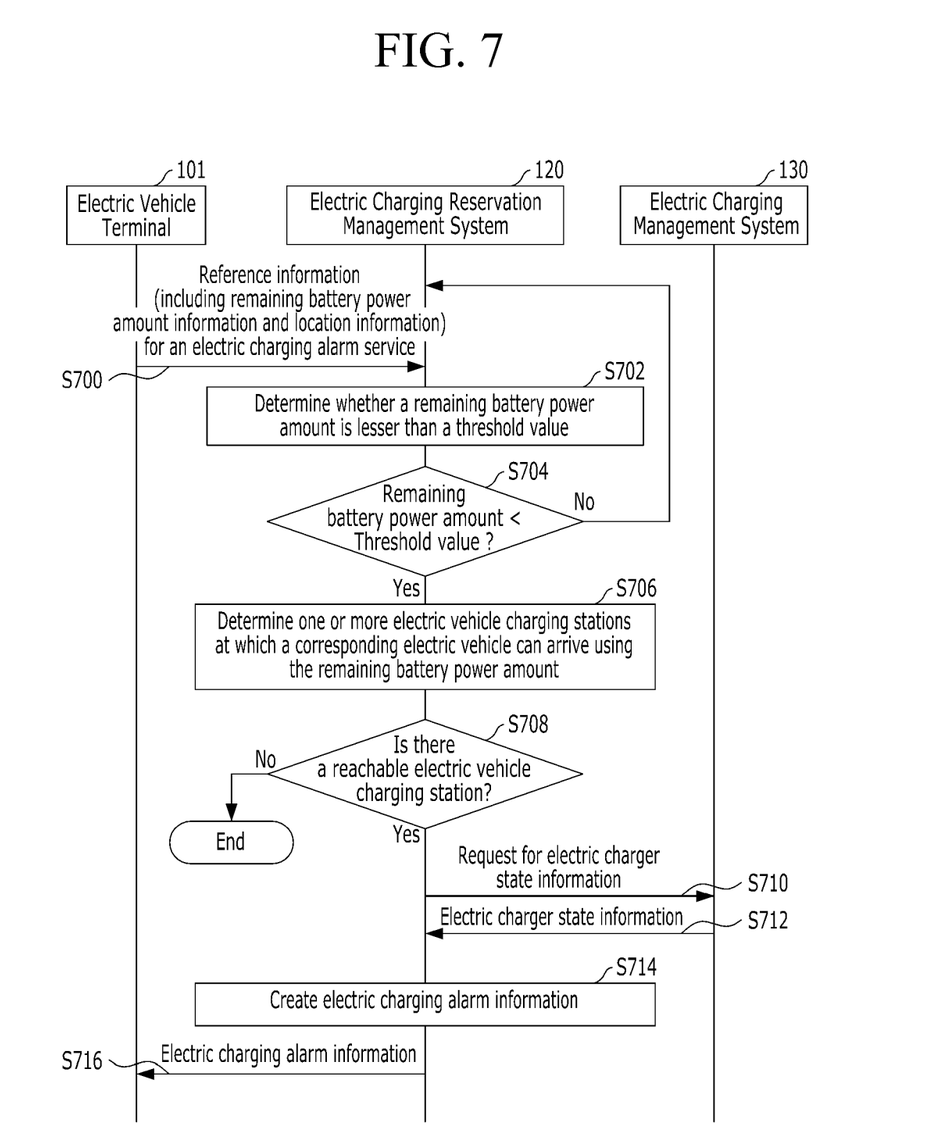
FIG. 7 illustrates a method of providing reservation alarm information for an electric vehicle charging, according to a remaining battery power amount in accordance with at least one embodiment.

FIG. 6 illustrates a method of providing reservation guide information for an electric vehicle charging in accordance with at least one embodiment.

Referring to FIG. 6, at step S600, in order to obtain charging reservation guide information, electric vehicle terminal 101 installed in an electric vehicle (e.g., 100) may periodically transmit reference information for an electric charging guide, to electric charging reservation management system 120. Herein, the reference information for the electric charging guide may include vehicle identification information, remaining battery power amount information, electric vehicle location information, and so forth. In other embodiments, electric vehicle terminal 101 may transmit reference information for an electric charging guide, in response to a request of electric charging reservation management system 120. Such reference information collection procedure may be applied to a case that a user approved an information collection associated with a corresponding electric vehicle in advance.

At step S602, when receiving the reference information for the electric charging guide from electric vehicle terminal 101, electric charging reservation management system 120 may determine whether the corresponding electric vehicle (e.g., 100) is within a predetermined range of a specific electric vehicle charging station.

At step S606, when the corresponding electric vehicle (e.g., 100) is within the predetermined range of the specific electric vehicle charging station (Yes-S604), electric charging reservation management system 120 may transmit a request for electric charger state information, to electric charging management system 130.

At step S608, electric charging management system 130 may transmit electric charger state information in response to the electric charger state information request, to electric charging reservation management system 120. Herein, the electric charger state information may include an electric charging schedule in the specific electric vehicle charging station.

At step S610, when receiving the electric charger state information from electric charging management system 130, electric charging reservation management system 120 may determine 'a time ($t_1$) when one or more electric chargers can be available' (i.e., an available start time ($t_1$) of the one or more electric chargers), based on the electric charger state information (e.g., electric charging schedule).

At step S612, electric charging reservation management system 120 may determine whether the corresponding electric vehicle can arrive at the specific electric vehicle charging station, before an available start time ($t_1$) of the one or more electric chargers. More specifically, electric charging reservation management system 120 may determine the reachability of the corresponding electric vehicle, based on the remaining battery power amount and the electric vehicle location information. For example, in the case that an electric charger is predicted to be available at the time ("$t_1$") when 30 minutes will elapse, electric charging reservation management system 120 may determine whether the corresponding electric vehicle can arrive at the specific electric vehicle charging station before the time ("$t_1$") when 30 minutes will elapse. At step S616, when the corresponding electric vehicle can arrive before the available start time ($t_1$) of the one or more electric chargers (Yes-S614), electric charging reservation management system 120 may create charging reservation guide information for the corresponding electric vehicle (e.g., 100). Herein, the charging reservation guide information may include a predicted required driving time (i.e., a required time when the corresponding electric vehicle goes to the specific electric vehicle charging station), a predicted waiting time for an electric charging, and/or the available start time. Furthermore, the charging reservation guide information may further include a request to set 'a charging amount' (i.e., a requested charging amount described in FIG. 4). In other embodiments, the charging reservation guide information may further include a threshold value associated with the request to set the charging amount. Herein, the threshold value may be predetermined by a corresponding electric vehicle charging station.

At step S618, electric charging reservation management system 120 may transmit the created charging reservation guide information to electric vehicle terminal 101 of the corresponding electric vehicle (e.g., 100).

When electric vehicle terminal 101 receives the charging reservation guide information from charging reservation management system 120, a corresponding electric vehicle user may select an electric vehicle reservation on a display screen of electric vehicle terminal 101. According to selection information of the electric vehicle user, electric vehicle terminal 101 may transmit a request for an electric charging reservation to charging reservation management system 120. In this case, as shown in FIG. 4 or FIG. 5, a method of managing an electric vehicle charging reservation may be applied.

In other embodiments, a method of providing reservation guide information may be performed based on a remaining battery power amount information (e.g., a 'state of charge' (SOC) information) of an electric vehicle. Such method will be described in detail with reference to FIG. 7.

FIG. 7 illustrates a method of providing reservation alarm information for an electric vehicle charging, according to a remaining battery power amount in accordance with at least one embodiment.

Referring to FIG. 7, at step S700, in order to receive a charging reservation alarm service, electric vehicle terminal 101 installed in an electric vehicle (e.g., 100) may periodically transmit reference information for an electric charging alarm service, to electric charging reservation management system 120. Herein, the reference information may include vehicle identification information, remaining battery power amount information, electric vehicle location information, and so forth. In other embodiments, electric vehicle terminal 101 may transmit reference information for an electric charging alarm service, in response to a request of electric charging reservation management system 120. Such reference information collection procedure may be applied to a case that a user approved an information collection associated with a corresponding electric vehicle in advance.

At step S702, when receiving the reference information for the electric charging alarm from electric vehicle terminal 101, electric charging reservation management system 120 may determine whether a remaining battery power amount is lesser than a threshold value. Herein, the threshold value may be predetermined by an electric vehicle user. The remaining battery power amount may be a currently remaining battery power amount of a corresponding electric vehicle. The remaining battery power amount may be expressed as a 'state of charge (SOC)' value [%] or an electric power value (e.g., kWh). Accordingly, the threshold value may be determined as an SOC value (e.g., 30%) or a specific electric power value (e.g., 10 kWh). Furthermore, if the threshold value is predetermined to be relatively great, electric charging alarm information provided to a corresponding electric vehicle (more specifically, electric vehicle terminal 101) may be unnecessary. Particularly, the number of battery charge/discharge cycles may affect the performance and the life-cycle of an electric battery. Accordingly, the threshold value may be required to be determined as a proper value. More specifically, the threshold value may be determined based on a charging efficiency, a management convenience, a battery performance, and/or a life-cycle of an electric battery.

At step S706, when the remaining battery power amount is lesser than the threshold value (Yes-S704), electric charging reservation management system 120 may determine one or more electric vehicle charging stations at which the electric vehicle (e.g., 100) can arrive using the remaining battery power amount. More specifically, electric charging reservation management system 120 may determine the one or more electric vehicle charging stations, based on the remaining battery power amount information and the electric vehicle location information received at step S700. Meanwhile, when the remaining battery power amount is greater than or equal to the threshold value (No-S704), electric charging reservation management system 120 may return to operation S700.

At step S710, when there is a reachable electric vehicle charging station (Yes-S708), electric charging reservation management system 120 may transmit a request for electric charger state information, to electric charging management system 130.

At step S712, electric charging management system 130 may transmit electric charger state information in response to the electric charger state information request, to electric charging reservation management system 120 corresponding to the reachable electric vehicle charging station (S708). Herein, the electric charger state information may include an electric charging schedule in the specific electric vehicle charging station.

At step S714, when receiving the electric charger state information from electric charging management system 130, electric charging reservation management system 120 may create electric charging alarm information, using the received electric charger state information. Herein, the electric charging alarm information may include a predicted required driving time (i.e., a required time when the corresponding electric vehicle goes to the reachable electric vehicle charging station), a predicted waiting time for electric charging. Furthermore, the electric charging alarm information may further include a request to set 'a charging amount' (i.e., a requested charging amount described in FIG.

4). In other embodiments, the electric charging alarm information may further include a threshold value associated with the request to set the charging amount. Herein, the threshold value may be predetermined by a corresponding electric vehicle charging station.

At step S716, electric charging reservation management system 120 may transmit the created electric charging alarm information to electric vehicle terminal 101 of the corresponding electric vehicle (e.g., 100).

When electric vehicle terminal 101 receives the electric charging alarm information from charging reservation management system 120, a corresponding electric vehicle user may select an electric vehicle reservation on a display screen of electric vehicle terminal 101. According to selection information of the electric vehicle user, electric vehicle terminal 101 may transmit a request for an electric charging reservation to charging reservation management system 120. In this case, as shown in FIG. 4 or FIG. 5, a method of managing an electric vehicle charging reservation may be applied.

With respect to a charging service provider, the present embodiment may improve an operation efficiency and a business feasibility by giving a higher priority for charging reservation, to an electric vehicle of which a predicted charging amount is large.

The present embodiment may enable users to relieve an anxiety about a short charging infrastructure and/or a discharge of an electric battery by efficiently providing/managing a charging reservation. Furthermore, the present embodiment may naturally increase a mileage of an electric vehicle by determining priority for a charging reservation based on a requested charging amount and/or a remaining battery power amount. The present embodiment may induce appropriate charging and discharging of an electric vehicle battery, thereby improving an optimal performance of the battery and increasing a life-cycle of the battery.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing, by an electric charging reservation management system, an electric charging reservation for an electric vehicle charging, the method comprising:
   obtaining current location information from an electric vehicle terminal associated with an electric vehicle;
   receiving a request for a search range for electric vehicle charging stations from the electric vehicle terminal;
   determining a distance of the electric vehicle to a specific electric vehicle charging station based on the current location information of the electric vehicle, and instructing the electric vehicle to the specific vehicle charging station;
   receiving one or more charging reservation guide requests from one or more electric vehicle terminals, wherein each of the one or more charging reservation guide requests includes a charging amount requested by an electric vehicle user and remaining battery power amount; and
   performing a charging reservation guide procedure associated with the one or more charging reservation guide requests, based on at least one of the requested charging amount and the remaining battery power amount,
   wherein in a case that two or more charging reservation guide requests are in a competition relationship for a same electric vehicle charging station, the performing includes:
   determining a priority order between the two or more charging reservation guide requests, wherein the priority order is determined such that a larger requested charging amount has a higher priority; and
   providing charging reservation guide information including a charging reservation sequence determined based on the priority order, to each corresponding electr is vehicle terminal.

2. The method of claim 1, wherein the performing includes:
   transmitting a reservation disapproval message to a corresponding electric vehicle terminal when the requested charging amount included in each charging reservation guide request is lesser than a threshold value.

3. The method of claim 1, wherein the performing includes:
   transmitting a reservation disapproval message to a corresponding electric vehicle terminal
   when the remaining battery power amount included in each charging reservation guide request is greater than a threshold value.

4. The method of claim 1, wherein in a case that the two or more charging reservation guide requests in the competition relationship include the same requested charging amount, the performing further includes:
   determining the priority order between the two or more charging reservation guide requests, based on the remaining battery power amount, wherein the priority order is determined such that a lesser remaining battery power amount has a higher priority.

5. The method of claim 4, wherein the remaining battery power amount is a battery power amount remaining at a time that a corresponding electric vehicle arrives at the same electric vehicle charging station.

6. The method of claim 4, wherein the performing includes:
   obtaining electric charger state information of the same electric vehicle charging station, from an electric charging management system;
   obtaining the number of available electric chargers from the electric charger state information;
   determining the charging reservation sequence between the two or more charging reservation guide requests, based on the determined priority order and the number of available electric chargers; and
   providing the charging reservation guide information including the charging reservation sequence, to each corresponding electric vehicle terminal.

7. The method of claim 6, wherein the charging reservation guide information further includes at least one of a predicted required driving time, a required charging time, and a predicted waiting time for electric charging.

8. The method of claim 1, wherein the determining includes:
   determining an available start time associated with one or more electric chargers, based on the electric charger state information; and
   determining whether the electric vehicle can arrive at the specific electric vehicle charging station, before the available start time of the one or more electric chargers.

9. The method of claim 8, wherein the available start time is a time when the one or more electric chargers can be available.

10. The method of claim 8, wherein the determining whether the electric vehicle can arrive at the specific electric vehicle charging station includes:
    determining whether the electric vehicle can arrive at the specific electric vehicle charging station, based on the remaining battery power amount and the location information of the electric vehicle.

11. The method of claim 8, wherein;
    the electric charger state information includes charging schedule information; and the charging reservation guide information includes at least one of the available start time, a predicted required driving time, and a predicted waiting time for an electric charging.

12. The method of claim 1, further comprising:
    providing reservation alarm information for the electric vehicle charging,
    wherein the providing reservation alarm information includes:
    determining whether a remaining battery power amount of an electric vehicle is lesser than a threshold value;
    determining one or more electric vehicle charging stations reachable by the electric vehicle when the remaining battery power amount of the electric vehicle is lesser than the threshold value; and
    providing electric charging alarm information to a corresponding electric vehicle terminal.

13. The method of claim 12, wherein the determining one or more electric vehicle charging stations includes:
    determining the one or more electric vehicle charging stations at which the electric vehicle can arrive, based on the remaining battery power amount and location information of the electric vehicle.

14. The method of claim 12, further comprising:
    obtaining electric charger state information associated with the reachable one or more electric vehicle charging stations, wherein the electric charger state information is employed for creation of the electric charging alarm information.

15. The method of claim 12, wherein the electric charging alarm information include at least one of a predicted required driving time, and a predicted waiting time for electric charging.

* * * * *

UNITED STATES PATENT AND TRADEMARK OFFICE
CERTIFICATE OF CORRECTION

PATENT NO.        : 11,126,932 B2                                                              Page 1 of 1
APPLICATION NO.   : 14/197760
DATED             : September 21, 2021
INVENTOR(S)       : Jin-Soo Kyoung It is certified that error appears in the above-identified patent and that said Letters Patent is hereby corrected as shown below:

In the Claims

In Claim 1, Column 21, Line 41, please replace "electr is" with --electric--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*